United States Patent [19]

Saito et al.

[11] Patent Number: 4,871,041
[45] Date of Patent: Oct. 3, 1989

[54] MOTORCYCLE FUEL TANK AND FUEL PUMP APPARATUS

[75] Inventors: Hiroshi Saito; Koichi Hikichi, both of Tokyo, Japan

[73] Assignee: Honda Giken Kogyo Kabushiki Kaisha, Tokyo, Japan

[21] Appl. No.: 152,840

[22] Filed: Feb. 5, 1988

[30] Foreign Application Priority Data

Apr. 14, 1987 [JP] Japan ................................. 62-91638

[51] Int. Cl.$^4$ ...................... B62K 11/04; B62K 19/30
[52] U.S. Cl. .................................... 180/219; 280/834; 417/366
[58] Field of Search .............. 280/5 A, 5 R; 180/219; 417/410, 366

[56] References Cited

U.S. PATENT DOCUMENTS

| | | | |
|---|---|---|---|
| 2,261,915 | 11/1941 | Korte et al. | 103/87 |
| 2,312,526 | 3/1943 | Curtis | 103/87 |
| 2,369,440 | 2/1945 | Curtis | 103/87 |
| 2,790,392 | 4/1957 | Schweiss | 103/53 |
| 2,937,755 | 5/1960 | Szwargulski | 210/172 |
| 3,000,321 | 9/1961 | Parker | 103/53 |
| 3,443,519 | 5/1969 | White | 103/5 |
| 3,507,582 | 4/1970 | Jeep, Jr. | 417/366 |
| 4,231,719 | 11/1980 | Ringwald et al. | 417/366 |
| 4,309,155 | 1/1982 | Heinz | 417/360 |
| 4,410,302 | 10/1983 | Chiba et al. | 417/299 |
| 4,569,637 | 2/1986 | Tuckey | 417/360 |
| 4,591,319 | 5/1986 | Takahashi et al. | 417/360 |
| 4,651,701 | 3/1987 | Weaver | 123/509 |
| 4,672,937 | 6/1987 | Fales et al. | 123/509 |
| 4,684,463 | 8/1987 | Mizusawa | 210/172 |
| 4,694,857 | 9/1987 | Harris | 137/565 |

FOREIGN PATENT DOCUMENTS

3514594 of 0000 Fed. Rep. of Germany .
58-67963 of 0000 Japan .

*Primary Examiner*—David M. Mitchell
*Assistant Examiner*—Donn McGiehan
*Attorney, Agent, or Firm*—Lyon & Lyon

[57] ABSTRACT

The fuel tank of a motorcycle or other similar vehicle contains an immersible fuel pump unit arranged to effectively pass fuel from the fuel tank regardless of reduced levels of fuel therein. Also, the fuel pump unit and other elements of the fuel supply system are organized to lower the center of gravity of the vehicle and to improve operation of the engine by more effectively exhausting air bubbles from the fuel flow stream and reducing the amount of heat capable of being transferred from the engine to the fuel supply pipe, thus to prevent expansion of any air bubbles that may migrate through the fuel supply pipe.

15 Claims, 6 Drawing Sheets

MOTORCYCLE FUEL TANK AND FUEL PUMP APPARATUS

BACKGROUND OF THE INVENTION

The present invention relates to fuel supply apparatus for motorcyles, or the like, and, particularly in one aspect to the structural organization of a fuel tank and immersible pump therefor. Another aspect of the present invention relates to an improved arrangement of operative elements in the fuel supply system of such vehicles.

In the vehicle body of a motorcycle, or the like, a fuel tank is generally provided with a pump unit of the immersible type arranged to transfer fuel from the fuel tank to the engine. Prior pump units that are immersed in the fuel tank are usually installed vertically and disposed in a corner of the fuel tank.

In motorcycles or similar vehicles, it is desired to lower the center of gravity of the vehicle to the extent possible, but in cases where the vehicle has the above-mentioned fuel supply system arrangement in which the pump is placed in an upright condition, there occurs the undesirable condition that the center of gravity is elevated.

Also, since a motorcycle turns by inclining the vehicle body, the fuel level in the fuel tank is frequently caused to undulate up and down. Accordingly, in a case where the pump unit is disposed in a corner of the tank, as mentioned above, there is produced the disadvantage that fuel cannot be pumped from the tank, notwithstanding the fact that a significant amount of fuel may remain in the fuel tank.

In the light of the aforesaid circumstances, it is an object of the present invention to provide a pump unit of immersible type for a fuel tank that is capable of increasing the amount of fuel capable of being pumped from the fuel tank in spite of changes in the liquid surface and, coincident therewith, a fuel pump apparatus that is capable of lowering the center of gravity of the vehicle.

Accordingly to another aspect, the invention contemplates an organization of the operative parts of a motorcycle, or the like, particularly elements of the fuel supply system thereof, arranged to improve vehicle operation.

SUMMARY OF THE INVENTION

In order to attain these objects, the present invention is characterized by a fuel supply system for a motorcycle, or the like, in which a pump unit of the type immersed in a fuel tank, is so constructed that a substantially cylindrical pump unit is disposed on the bottom surface of the fuel tank at the lowermost portion thereof, and located on the lateral center of the fuel tank bottom, whereby the pump unit is arranged with its longitudinal axis generally horizontally disposed and directed forwardly of the vehicle body.

According to this aspect of the invention, the pump unit is arranged on the lowermost portion of the bottom surface of the fuel tank and on the lateral center of such surface. This region of the fuel tank is least affected by a change in the liquid surface, even if the vehicle body inclines and the liquid surface undulates up and down, and, therefore, the fuel in the fuel tank can be effectively fed by the pump. Also, since the pump unit is horizontally disposed it is possible, correspondingly, to lower the center of the gravity of the vehicle.

The present invention further contemplates an improved organization of the operative parts of the elements includable in the fuel system of the vehicle, e.g., the fuel tank, fuel supply pipe, the carburetor or fuel injector, together with the engine, to reduce the amount of heat transferred to the fuel in flowing to the engine from the fuel tank, thereby to reduce the possibility of air entrapment in the fuel flow.

For a better understanding of the invention, its operating advantages and the specific objectives obtained by its use, reference should be made to the accompanying drawings and description which relate to a preferred embodiment thereof.

DESCRIPTION OF A PREFERRED EMBODIMENT OF THE INVENTION

Figure 1:
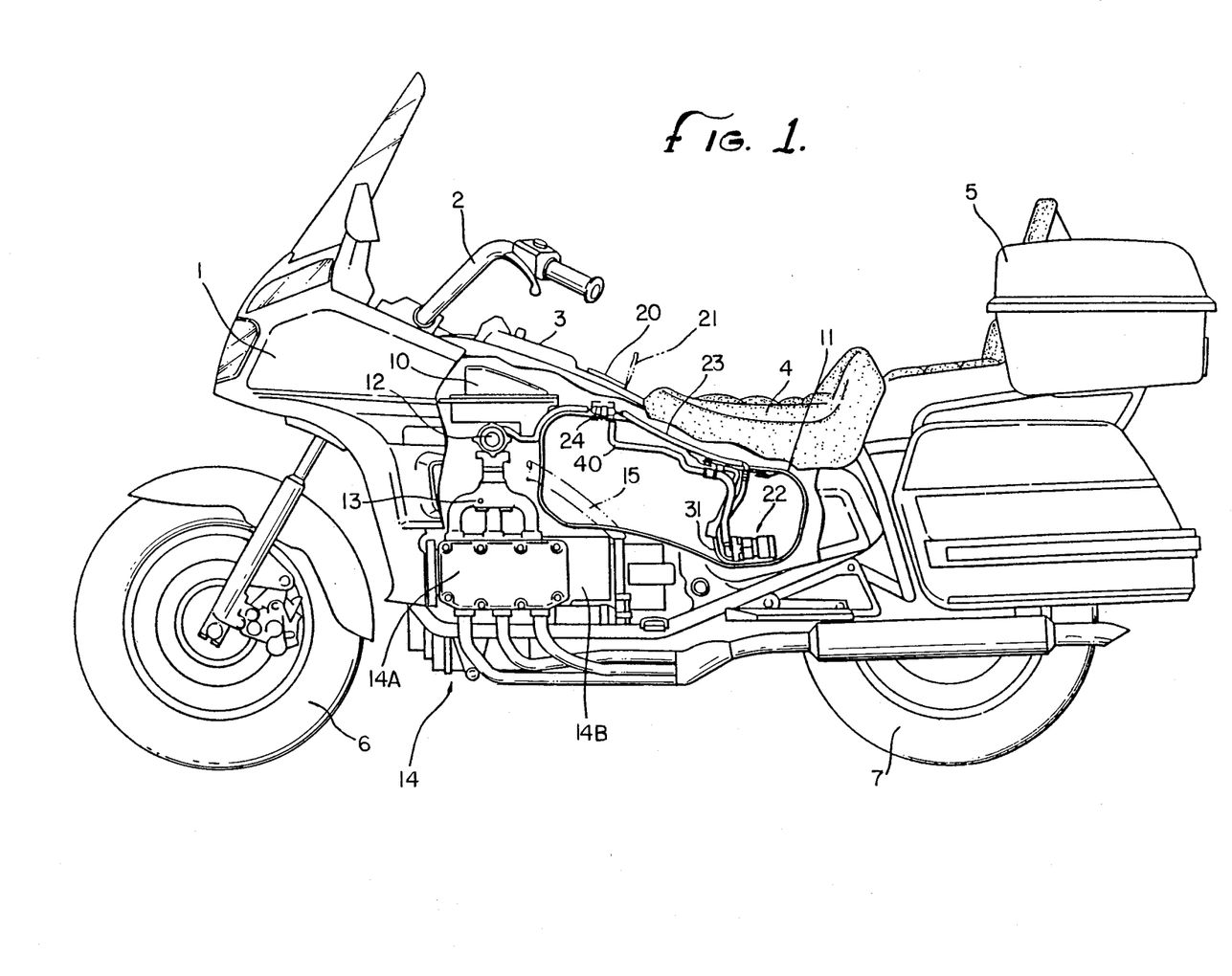
FIG. 1 is an elevational view illustrating a motorcycle incorporating the present invention.

In FIG. 1, reference numeral 1 indicates a fairing which covers a front portion of a vehicle body, and reference numeral 2 indicates a steering handle. In the rear of the steering handle 2 are provided, in turn, a tank shell 3, seat 4 and storage cases 5 for receiving small articles arranged on left and right sides of the vehicle rear end. Also, reference numeral 6 indicates a front wheel steered by the handle 2 and reference numeral 7 indicates a rear wheel which is the driving wheel of the vehicle.

The tank shell 3 does not function as a fuel tank but instead, has as its function to cover an air cleaner and the front portion of the fuel tank 11 arranged beneath the underside of the tank shell. On the lowerside of the air cleaner 10 is provided a carburetor 12 of down draft type which supplies a fuel mixture to an engine 14 disposed beneath the carburetor 12 through the intermediary of a communicating tube 13. The illustrated engine 14 consists of a so-called "horizontal opposed" type of engine body 14A which has a total of six cylinders, three cylinders projecting from each side, and a power transmission system 14B arranged at the rear of the engine body 14A.

Thus, beneath the tank shell 3 are arranged, in turn, from the upperside, the air cleaner 10, the carburetor 12 and the engine 14. Since it is technically desirable to arrange an element of heavy weight as low as possible, the arrangement of these new members has the advantage of being capable of lowering the center of gravity of the vehicle to the extent possible.

The vehicle fuel tank 11 is disposed at a position which locates it rearwardly of both the air cleaner 10 and of the carburetor 12 and below the tank shell 3 and the seat 4. The fuel tank 11 has a shape somewhat elevated at its front portion, as compared with its rear portion, so as to adapt the height of the tank shell 3 and the seat 4 to the position of the engine 14 and thereby prevent interference therebetween. Also, the front lower portion of the fuel tank 11 is formed in a forked or bifurcated shape so as to be capable of straddling frame element 15 existing in the center of the vehicle body.

Figure 3:
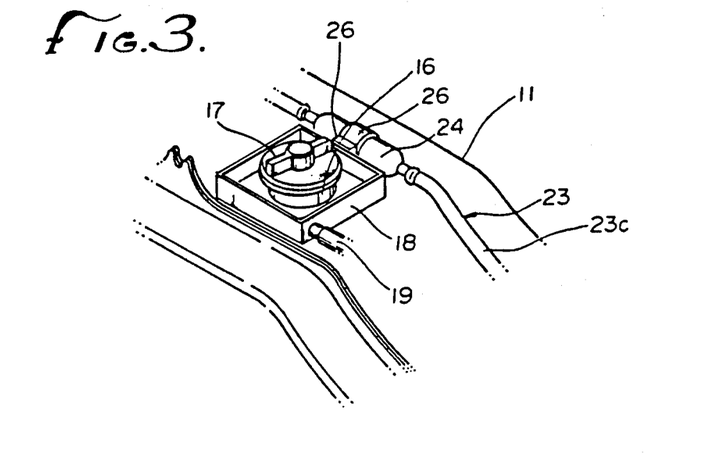
FIG. 3 is a partial perspective view taken in the direction of the arrow III of FIG. 2.

At the front uppermost portion of the fuel tank 11 is provided a fuel supply port 16, as shown in FIG. 3, which is normally closed by means of a cap 17. The fuel supply port 16 is surrounded by a wall 18 through which a waste pipe 19 is passed. The waste pipe 19 is formed of rubber and is arranged to extend to the lower portion of the vehicle body. The waste pipe 19 serves to conduct to the outside of the vehicle body any fuel that may be spilled within the surrounding wall during filling of the tank with fuel. An opening 20 is provided in the tank shell 3 just above the fuel supply port 16, which opening is capable of being closed by means of a lid 21 provided with a key lock.

Accordingly, when it is desired to supply fuel into the fuel tank 11, it is performed by supplying the fuel after opening the lid 21 by means of a key (not shown) and removing the threaded cap 17. After filling, the cap 17 is threadedly tightened and the lid 21 closed and locked by means of the key.

Figure 2:
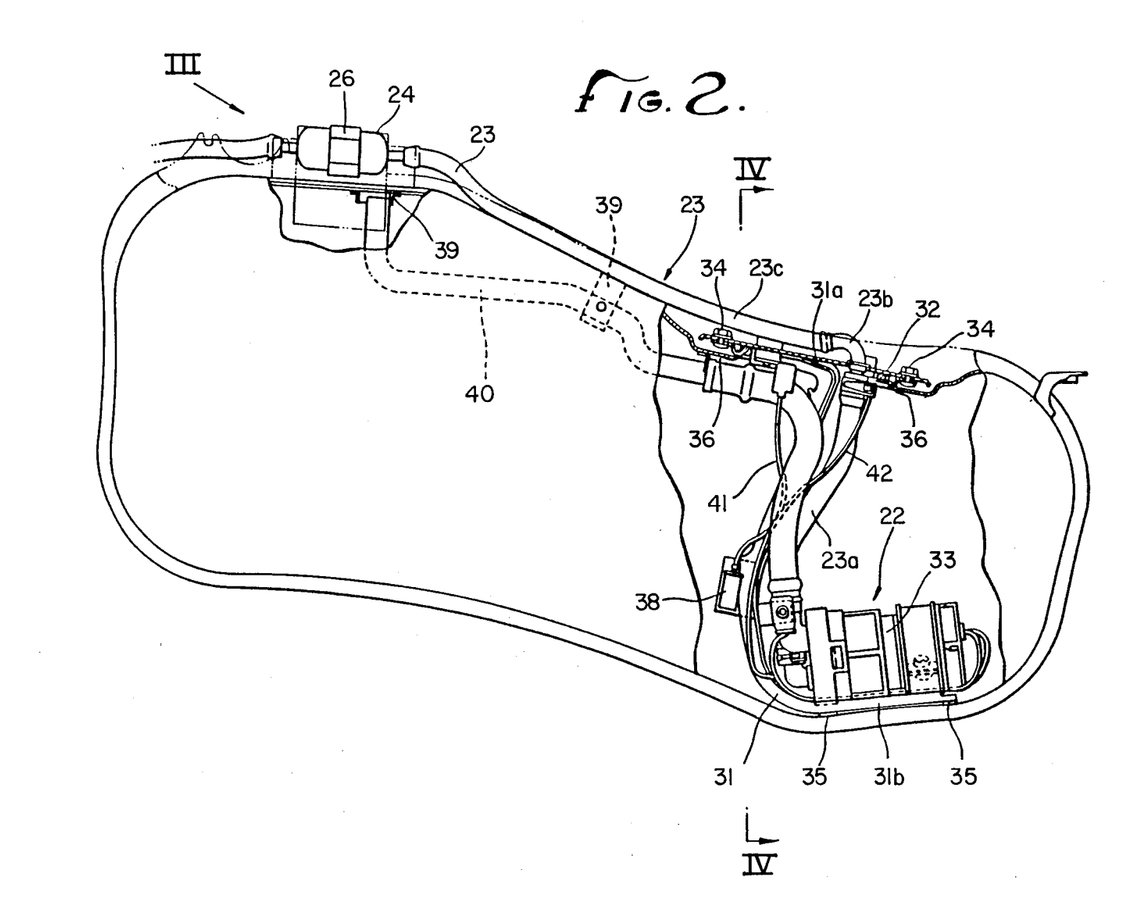
FIG. 2 is a partially cut away view illustrating the fuel tank of the motorcycle of FIG. 1.

On the lower rear portion of the fuel tank 11 is provided a pump unit 22, as described in greater detail hereinafter. A fuel supply pipe 23 extending from the pump unit 22 extends to the outside of the fuel tank 11 by passing through an opening in the upper rear surface of the fuel tank. Thereafter, the fuel supply pipe 23 is offset and extends to the front portion of the fuel tank 11 past the upper front part of the latter. Following this, the fuel supply pipe 23 passes between the fuel tank 11 and the air cleaner 10 and extends to the carburetor 12 to be connected therewith. When the fuel supply pipe 23 passes the upper front portion of the fuel tank 11, it passes in the vicinity of the fuel supply port 16. Also, a filter 24 is interposed in the fuel supply pipe 23 at a position in the vicinity of the fuel supply port 16. The filter 24, as show in FIG. 3, is mounted on a bracket 25 detachably fixed to the surrounding wall 18 through the intermediary of a rubber clamp 26 mounted on the side of the wall 18.

In the illustrated embodiment of the invention, the leading end of the fuel supply pipe 23 is, as shown, connected to the carburetor 12. However, in an engine of the type provided with a fuel injector, the leading end of the fuel supply pipe 23 may be connected to the fuel injector (not shown) in place of the carburetor 12.

As mentioned above, the fuel supply pipe 23 extending from the fuel tank 11 is arranged to extend across the upper portion of the tank in order to connect it to the carburetor 12 or to the fuel injector. Arranging the pipe 23 in this manner avoids warming the fuel by the transfer of heat from the engine 14 as would occur if the fuel supply pipe 23 were to extend past the lower portion of the fuel tank 11. By means of this arrangement, therefore, the possibility of creating bubbles which may expand due to the application of heat when they exist in the fuel is avoided.

Also, since the fuel supply pipe 23 passes in the vicinity of the fuel supply port 26 when it extends across the upper portion of the fuel tank 11, the fuel supply pipe 23 is accordingly exposed and accessible when the lid 21 of the tank shell 3 is opened. In this way maintenance of the fuel line is facilitated. For the same reason, the filter 24 is also arranged in the vicinity of the fuel supply port 23.

Figure 4:
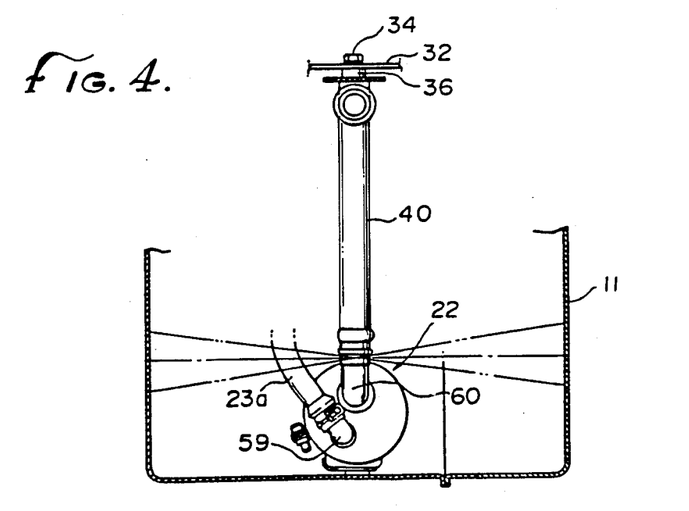
FIG. 4 is a sectional view taken along line IV—IV of FIG. 2.

In the described arrangement the pump unit 22, being of cylindrical shape and of the immersible type, is placed on the rear bottom surface of the fuel tank 11 locating it at the lowermost portion thereof and at the lateral center of the tank. The pump unit 22 has its longitudinal axis disposed substantially horizontally and extending toward the forward direction of the vehicle body. Thus, arranging the pump unit 22 in such a generally horizontal condition has the advantage that the center of gravity of the vehicle body is lowered as compared with prior art pump units that are arranged in an axis-upstanding condition. Also, since the pump unit 22 is arranged at the lateral center of the rear bottom surface of the fuel tank 11, when the vehicle body is banked to the left or to the right, even if the liquid surface in the fuel tank is inclined as shown by the phantom lines in FIG. 4, the effect of such liquid surface inclination on the pump unit 22 is reduced.

The pump unit 22 is installed in the fuel tank 11 in the following manner. As shown in FIG. 2 reference numeral 31 indicates a bracket for supporting the pump unit 22. The bracket 31, which may be formed of synthetic resin or by steel plate is bent into a Z-shape when viewed from the side. An upper flat portion 31a of the bracket 31 is fixed to the tank by fixing means, such as a bolt or the like, and on an upper surface of a lower flat portion 31b is mounted the pump unit 22 by means of a rubber clamp 33. The bracket 31 is disposed at the desired position and fixed thereat by means of a flat plate 32 fixed to the fuel tank 11 by nuts 34, 34 and, at the same time, the bottom surface of the lower flat portion 31b abuts the bottom surface of the fuel tank 11 through the intermediary of a rubber grommet 35. Further, reference numeral 36 indicates a seal member which is interposed at the interface between the flat plate 32 and the fuel tank 11.

To the flat plate 32 is secured the fuel supply pipe 23b which is angularly bent the required degree upon passing through the plate. The fuel supply pipe 23b, as shown, is connected at its inner end inside the fuel tank 11 to a fuel supply pipe 23a extending from the pump unit 22. The outer end of the fuel supply pipe 23b is, on the other hand, connected to a fuel supply pipe 23c extending across the upper portion of the fuel tank 11. Thus, fuel exhausted from the pump unit 22 is fed to the aforesaid carburetor 12 through the intermediary of these fuel supply pipes 23a, 23b and 23c.

A level gauge 38 mounted on a portion of the bracket 31 somewhat below its center at the required height is operative to generate a signal when the fuel level falls below a given level. Due to the signal thus generated, the fuel pump can be briefly stopped thereby to indicate the fact that the fuel level has fallen below the prescribed level. In this case, operation of the fuel pump is designed to be reinstated upon by being returned to the "ON" state. Alternatively, the level gauge 38 may be arranged only to indicate the amount of fuel remaining in the tank when the fuel has fallen below the given level.

On a lower side portion of the upper surface of the fuel tank 11 is disposed an air purging tube 40 supported by stays 39, 39. The upper, outlet end of the air purging tube 40 is arranged to extend up to the vicinity of the fuel supply port, which is the uppermost portion in the fuel tank. Also, the lower end of the air purging tube 40 is connected to a connecting tube for purging air from the pump, as described hereinafter.

Reference numeral 41 indicates a power supply cord for supplying electric power to the pump unit 22 and reference numeral 42 indicates a cord extending from the aforesaid level gauge in order to feed the signal generated thereby.

Figure 5:
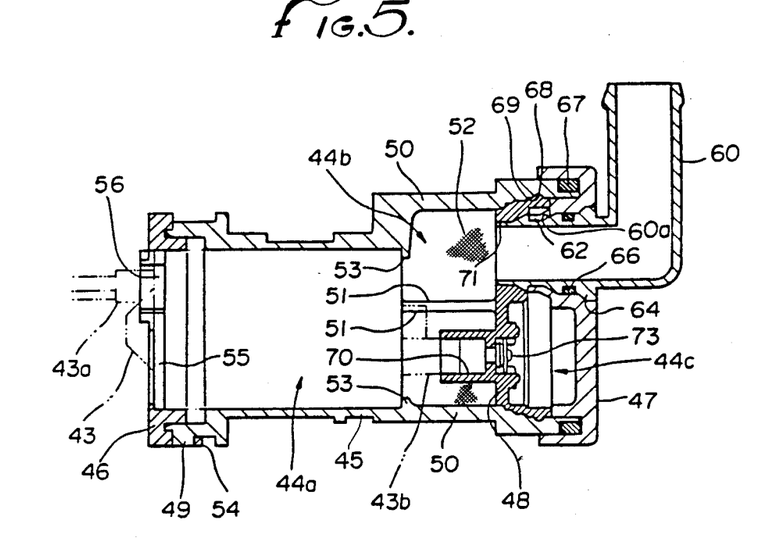
FIG. 5 is a sectional elevational view of the fuel pump unit according to the present invention.
Figure 6:
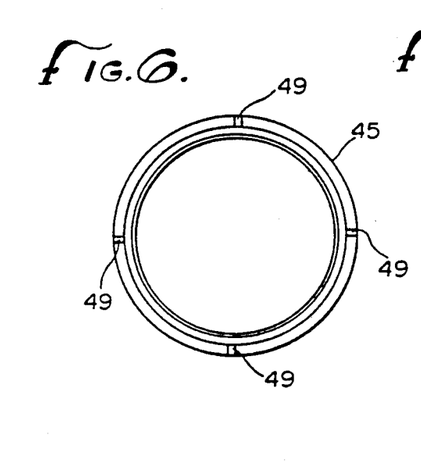
FIG. 6 is an end view of the casing of the fuel pump unit of FIG. 5.

With particular reference to FIG. 5 the pump unit 22, is arranged to have as main component members, a fuel pump 43 and a casing 44 enclosing the fuel pump 43. The casing 44 is desirably formed of synthetic resin and includes a casing body 45 formed in a substantially circular cylindrical shape, cover bodies 46, 47 fitted on each of ends of the casing body 45, and a partition plate 48 fitted in the casing body 45. Inside the casing body 45 are provided a pump-receiving portion 44a for inserting and fixing the aforementioned fuel pump 43 therein, a filter portion 44b arranged to communicate with the suction portion of the fuel pump 43, and a storing portion 43c arranged to communicate with the exhaust portion of the aforesaid fuel pump 43. These three portions are axially spaced from one end to the other of the casing body 45. The pump-receiving portion 44a is formed of a smaller diameter than those of the filter portion 44b and the storing portion 44c. Also, the pump-receiving portion 44a is positioned eccentrically with respect to the filter portion 44b and the storing portion 44c.

That portion 44a of the casing body 45 which receives the pump 43 is formed to have its inner diameter substantially equal to, or somewhat larger than, the outer diameter of the fuel pump 43. On the outer periphery of one end of the casing body 45 are provided a plurality of projections 49 with which the cover body 46 engages. The projections 49 are provided integrally with the casing body 45 and project radially outwardly. Also, in the portion 44b of the casing 45 at which the filter 52 is disposed are provided a plurality of throughbores 51 which effect communication between the inside and the outside of the casing body 45. These through-bores 51 are formed by means of plural ribs 50 that extend longitudinally and are circumferentially spaced about the casing body 45. The through-bores 51 are covered with a mesh-like filter 52 mounted on the casing body 55. The filter 52 may be formed by insert elements mounted integrally on the casing body 45.

On the boundary between the filter portion 44b and the pump receiving portion 44a is formed an engaging piece 53 projecting radially from the inner surface of the pump receiving portion 44a, as shown in FIG. 5. The engaging piece 53 serves to position the fuel pump 43 when the latter is received in the pump receiving portion 44a and caused to abut the engaging piece 53.

Figure 7:
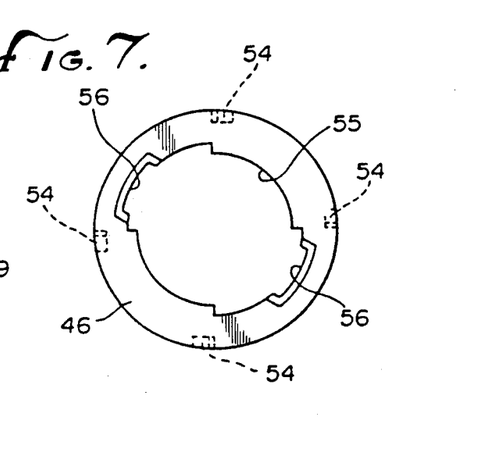
FIG. 7 is an end view of the front end cover of the casing of the fuel pump unit of FIG. 5.
Figure 8:
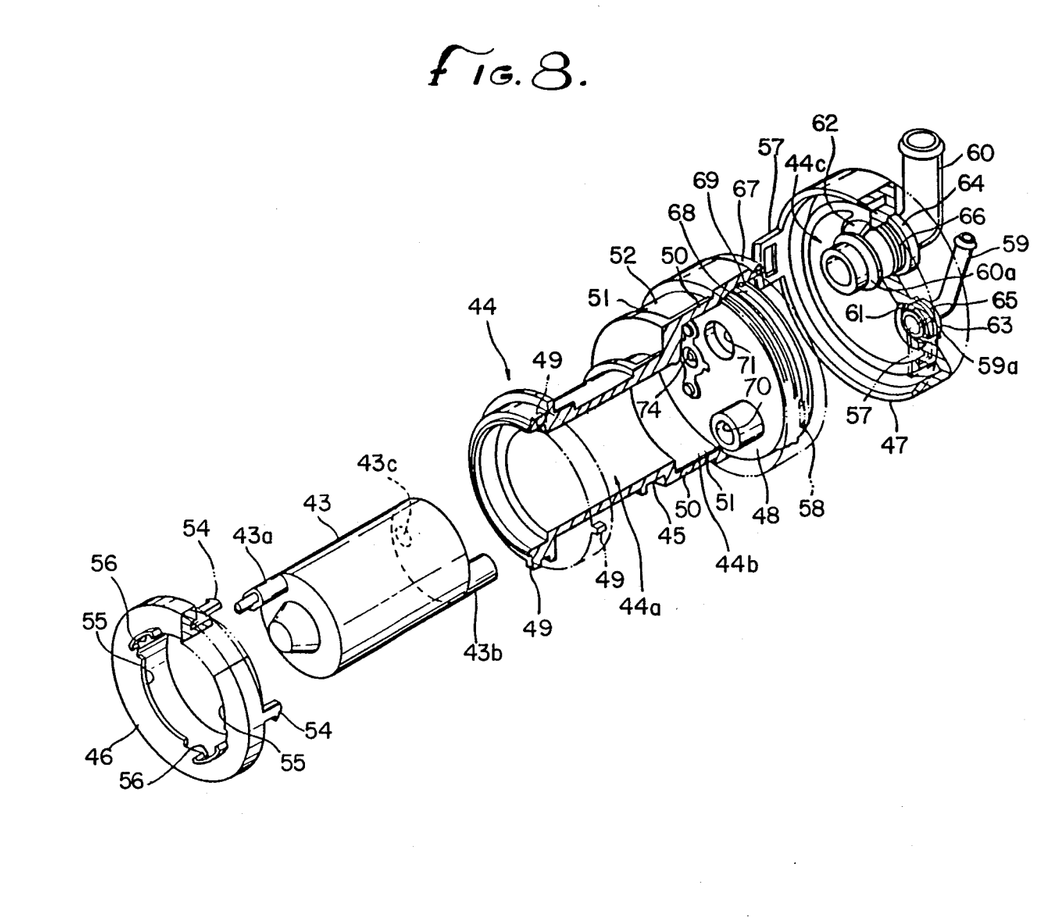
FIG. 8 is an exploded perspective view of the fuel pump unit of FIG. 5.

The cover body 46 mounted on one end of the aforesaid casing body 45 is formed with a generally ring shape, as shown in FIGS. 5, 7 and 8. About the outer periphery of the cover body 46 is formed engaging pieces 54 which operate to engage the projections 49 formed on the casing body 45 to secure the cover body to the casing body. Integrally formed on the inner periphery of the cover body 45 is an engaging piece 55 which operates to abut the end portion of the fuel pump 43 is inserted inside the cover body 46 when mounted on the casing body 45. Also, in the inner periphery of the cover body 46 are formed diametrically recessed portions 56 which are fitted by a power supply cord drawing portion 43a provided on the fuel pump 43.

Accordingly, the aforesaid cover body 46 is mounted on the casing body 45 by engaging the engaging pieces 54 with the projections 49 of the casing body 45. Also, the cover body 46 is arranged to fix the fuel pump 43 by means of its cooperatively engaging piece 55 on the inner periphery of the cover body at one end and the engaging piece 53 at the other end. By fitting the power supply cord drawing portion 43a into the recessed portion 56, it is possible to position the fuel pump 43 and the casing body 45 in the peripheral direction.

Thus, the described fuel pump 43 is so positioned that its exhaust port 43b is located at a lower portion (the lower portion illustrated in FIGS. 5 and 8) and its suction port 43c is located at a more elevated position than the exhaust port 43b.

The cover body 47 mounted on the other end of the casing body 45 is formed with a generally disc like shape. On the outer periphery of the cover body 47 are provided ring-like engaging pieces 57 at two circumferentially spaced positions about the casing 44. The other end of the casing body 44 is closed by the engaging portion 57 which is adapted to engage the projections 58 formed on the outer surface of the other end of the casing body 45. The cover body 47 is designed to be mounted in a condition in which it is positioned in the peripheral direction to the casing body 45.

Penetrating the cover body 47 are a first connecting pipe 59 for connecting the fuel supply pipe 23 to the storing portion 44c, and a second connecting pipe 60 for connecting the air purging tube 40 to the filter portion 44b. In these connecting pipes 49 and 60, respectively, are formed annular grooves 59a and 60a, and flanges 63 and 64 adapted to abut the cover body 47. Into the annular grooves 59a and 60a are fitted resiliently deformable engaging pieces 61 and 62 which are formed integrally with the cover body 47. In the vicinity of each of the flanges 63 and 64 are positioned O-rings 65 and 66 which close airtightly the fitting portion between the respective connecting pipes 59 and 60 and the cover body 47.

The connecting pipe 60 to which the aforesaid air purging tube 40 is connected is positioned on the cover body 47 in such manner that the connecting pipe 60 is disposed above the center portion of the cover body 47 when the latter is mounted on the casing body 45 and the other connecting pipe 59 is disposed below the cover center and lower than the connecting pipe 60.

As shown in FIGS. 5 and 8, and O-ring 67 is interposed into the mounting portion between the cover body 47 and the casing body 45 in order to form an airtight seal therebetween.

The partition plate 48 between portions 44b and 44c is formed in a generally disc like shape, as shown in FIGS. 8 to 11. This plate 48 is fixed on the casing body 45 by an annular projection 68 formed about the peripheral side surface of the plate that fits into an annular groove 69 formed in the inner peripheral surface of the casing body 45, whereby the partition plate 48 airtightly seals the filter portion 44b from the storing portion 44c.

Figure 9:
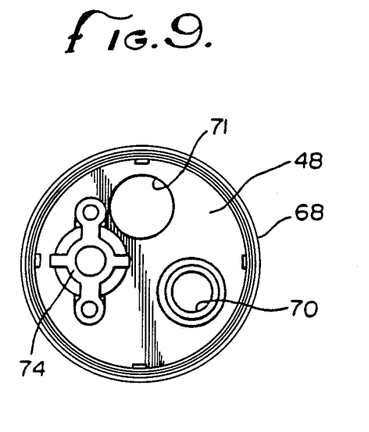
FIG. 9 is a front end view of the partition plate in the fuel pump unit of FIG. 5.
Figure 10:
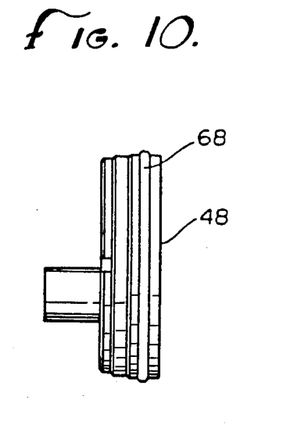
FIG. 10 is a side view of the partition plate of FIG. 9.
Figure 11:
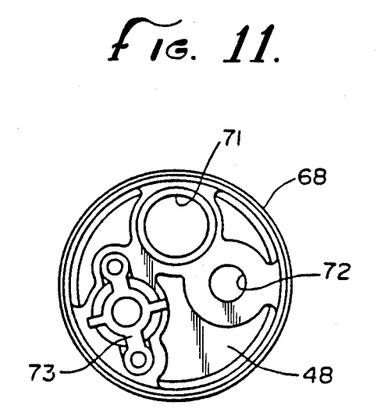
FIG. 11 is a rear end view of the partition plate in the fuel pump unit of FIG. 5.

Penetrating the partition plate 48 are a communicating bore 70 into which the exhaust port 43b of the fuel pump 43 is fitted, an exhaust bore 71 into which the air purging tube 40 is fitted, and a bypass bore 72 which is provided to communicate the storing portion 44c with the filter portion 44b. These bores, as shown in FIGS. 9 and 11, are positioned on the partition plate 48 in the descending order of the exhaust bore 71, the bypass bore 72 and the communicating bore 70.

In the communicating bore 70 is mounted a check valve 73 which prevents backflow of fuel from the storing portion 44c to the exhaust port 43b of the fuel pump 43. In the bypass bore 72 is mounted a relief valve 74 effective to discharge fuel from the storing portion 44c to the filter portion 44b when the pressure of the fuel in the storing portion 44c exceeds a predetermined value. The relief valve 74 opens immediately beneath the exhaust port 71 in the filter chamber, whereby the fuel having a relatively small amount of mixing air can be again induced into the pump and any bubbles contained in the fuel are readily adapted to escape to the exhaust port.

The above description pertains the present invention as applied to the motorcycle, but, obviously the invention can be equally applied to other comparable vehicles.

It will be further appreciated that, according to one aspect of the present invention, a pump unit can be so arranged on the bottom surface of a fuel tank as to permit the pump unit, even if the vehicle body may be inclined and the liquid surface of the fuel in the fuel tank is caused to be undulated up and down, to effectively supply fuel in a stable manner.

Also, by arranging the pump unit in an axis-horizontal condition, the center of gravity of the vehicle can be lowered.

Furthermore, the elements that comprise the fuel supply system are arranged in the vehicle in a manner to suppress the incursion of air bubbles into the fuel flow stream by reducing heat transfer from the engine to the fuel supply pipe. Also, the fuel pump unit provides means for readily exhausting any air bubbles that may be generated in the fuel supply pipe.

It should be further understood that, although a preferred embodiment of the invention has been illustrated and described herein, changes and modifications can be made in the described arrangement without departing from the scope of the appended claims.

We claim:

1. A vehicle, such as a motorcycle, or the like, comprising:
   an engine:
   fuel supply means operably connected to said engine;
   a fuel tank carried by said vehicle;
   a fuel pump in the bottom of said fuel tank;
   a fuel supply pipe extending from said fuel pump through the top of said fuel tank and connecting with said fuel supply means; and
   a fuel supply port in said fuel tank; a tank shell carried by said vehicle enclosing at least the top of said fuel tank; an opening in said tank shell for accessing said fuel supply port; and said fuel supply pipe extending between said fuel tank and said tank shell and being accessible from said tank shell opening.

2. The vehicle according to claim 1 in which said fuel supply means is a carburetor.

3. The vehicle according to claim 1 in which said fuel supply means is a fuel injector.

4. The vehicle according to claim 1 including a fuel filter in said fuel supply pipe, said fuel filter being positioned in said fuel supply pipe to be accessible from said tank shell opening.

5. The vehicle according to claim 1 in which said fuel tank is positioned between said engine and said fuel supply pipe.

6. The vehicle according to claim 5 including an air filter operably connected to said fuel supply means and wherein said air filter, said fuel supply means and said engine are disposed in substantial vertical alignment beneath said tank shell and said fuel tank is positioned rearwardly thereof.

7. The vehicle according to claim 6 in which said fuel supply pipe extends between said fuel tank and said air filter in connecting with said fuel supply means.

8. A fuel supply organization for a vehicle including a fuel tank adapted to contain a body of fuel therein and a fuel pump supportedly disposed in said fuel tank immersed in said body of fuel, said fuel pump comprising:
   a casing containing substantially horizontally aligned chambers including a pump chamber, a surge chamber and a filter chamber interposed therebetween;
   a pump in said pump chamber having a suction port communicating with said filter chamber and an exhaust port communicating with said surge chamber; and
   means for feeding fuel from said surge chamber to a point of use.

9. A fuel supply organization for a vehicle according to claim 8 in which the wall of said fuel pump casing forming said filter chamber contains a plurality of radial openings establishing fluid communication between said fuel tank and said filter chamber.

10. A fuel supply organization for a vehicle according to claim 9 including a filter material covering said radial openings.

11. A fuel supply organization for a vehicle according to claim 9 in which said radial openings are circumferentially spaced about the wall of said casing.

12. A fuel supply organization for a vehicle according to claim 8 including means for purging air from said filter chamber.

13. A fuel supply organization for a vehicle according to claim 12 in which said filter chamber is dimensionally greater in the radial direction than said pump chamber; and an air purge passage communicating with said filter chamber above the suction port to said pump chamber.

14. A fuel supply organization according to claim 8 in which said fuel pump is supportedly positioned on substantially the lowermost surface of said fuel tank.

15. A fuel supply organization according to claim 14 in which the longitudinal axis of said fuel pump extends substantially parallel to the longitudinal axis of said vehicle.

* * * * *